(12) United States Patent
Lai et al.

(10) Patent No.: US 12,182,335 B2
(45) Date of Patent: Dec. 31, 2024

(54) HEAD-MOUNTED DISPLAY, TAPPING INPUT SIGNAL GENERATING METHOD AND NON-TRANSITORY COMPUTER READABLE STORAGE MEDIUM THEREOF

(71) Applicant: HTC Corporation, Taoyuan (TW)

(72) Inventors: Chao-Hsiang Lai, Taoyuan (TW); Cheng-Han Hsieh, Taoyuan (TW); HsinYu Feng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/299,722

(22) Filed: Apr. 13, 2023

(65) Prior Publication Data
US 2023/0333664 A1    Oct. 19, 2023

Related U.S. Application Data

(60) Provisional application No. 63/362,888, filed on Apr. 13, 2022.

(51) Int. Cl.
*G06F 3/01*    (2006.01)

(52) U.S. Cl.
CPC .............. *G06F 3/017* (2013.01); *G06F 3/011* (2013.01); *G06F 3/015* (2013.01)

(58) Field of Classification Search
CPC .......... G06F 3/017; G06F 3/011; G06F 3/015; G02B 27/017
See application file for complete search history.

(56) References Cited

U.S. PATENT DOCUMENTS

| | | | |
|---|---|---|---|
| 11,422,623 B2 | 8/2022 | Ma et al. | |
| 2015/0370326 A1* | 12/2015 | Chapeskie | G06F 1/163 345/156 |
| 2018/0197624 A1* | 7/2018 | Robaina | G06F 16/2379 |
| 2019/0265781 A1 | 8/2019 | Kehoe et al. | |
| 2020/0097082 A1* | 3/2020 | Berenzweig | G06F 3/014 |
| 2021/0096726 A1* | 4/2021 | Faulkner | G06F 3/04815 |

FOREIGN PATENT DOCUMENTS

WO    2021046267 A1    3/2021

* cited by examiner

*Primary Examiner* — Patrick N Edouard
*Assistant Examiner* — Joseph P Fox
(74) *Attorney, Agent, or Firm* — CKC & Partners Co., LLC

(57) ABSTRACT

A head mounted display, tapping input signal generating method, and non-transitory computer readable storage medium thereof are provided. Based on a plurality of real-time images, the head-mounted display determines whether a first finger among the plurality of fingers corresponds to a tapping pattern. The head-mounted display determines whether a sensing signal received from a wearable device matches a tapping gesture of the first finger in response to having the first finger among the fingers corresponding to the tapping pattern. The head-mounted display generates a tapping input signal corresponding to the first finger in response to the sensing signal matching the tapping gesture of the first finger.

18 Claims, 9 Drawing Sheets

HEAD-MOUNTED DISPLAY, TAPPING INPUT SIGNAL GENERATING METHOD AND NON-TRANSITORY COMPUTER READABLE STORAGE MEDIUM THEREOF

CROSS-REFERENCE TO RELATED APPLICATION

This application claims priority to U.S. Provisional Application Ser. No. 63/362,888, filed Apr. 13, 2022, which is herein incorporated by reference in its entirety.

BACKGROUND

Field of Invention

The present invention relates to a head-mounted display, tapping input signal generating method, and non-transitory computer readable storage medium thereof. More particularly, the present invention relates to a head-mounted display, tapping input signal generating method, and non-transitory computer readable storage medium thereof that can correctly generate a tapping input signal through the determining operation of a head-mounted display and a wearable device.

Description of Related Art

In recent years, various technologies related to virtual reality have developed rapidly, and various technologies and applications of head-mounted displays have been proposed one after another.

In the prior art, when the user wears a head-mounted display with inside-out tracking and positioning, the user can input data (e.g., input the text data) by operating the physical buttons on the handheld controller or input data by hand tracking.

However, in the case of operating the physical buttons on the handheld controller, the hand of the user operating the controller may not be able to perform other additional operations. In addition, since the user needs to operate the physical buttons on the handheld controller, it is usually difficult for the user to quickly input the data. Furthermore, when using hand tracking to determine the input data, it is difficult to accurately determine whether the user has a clear input action, and thus misjudgment is prone to occur.

Accordingly, there is an urgent need for a technology that can correctly generate a tapping input signal and does not require the user to hold the controller.

SUMMARY

An objective of the present disclosure is to provide a head-mounted display. The head-mounted display comprises an image capturing device and a processor, and the processor is coupled to the image capturing device. The image capturing device is configured to capture a plurality of real-time images including a plurality of fingers of a user. The processor determines whether a first finger among the fingers corresponds to a tapping pattern based on the real-time images. The processor determines whether a sensing signal received from a wearable device matches a tapping gesture of the first finger in response to having the first finger among the fingers corresponding to the tapping pattern. The processor generates a tapping input signal corresponding to the first finger in response to the sensing signal matching the tapping gesture of the first finger.

Another objective of the present disclosure is to provide a tapping input signal generating method, which is adapted for use in an electronic apparatus. The tapping input signal generating method comprises the following steps: determining whether a first finger among a plurality of fingers corresponds to a tapping pattern based on a plurality of real-time images including the fingers of a user; determining whether a sensing signal received from a wearable device matches a tapping gesture of the first finger in response to having the first finger among the fingers corresponding to the tapping pattern; and generating a tapping input signal corresponding to the first finger in response to the sensing signal matching the tapping gesture of the first finger.

A further objective of the present disclosure is to provide a non-transitory computer readable storage medium having a computer program stored therein. The computer program comprises a plurality of codes, the computer program executes a tapping input signal generating method after being loaded into an electronic apparatus. The tapping input signal generating method comprises following steps: determining whether a first finger among a plurality of fingers corresponds to a tapping pattern based on a plurality of real-time images including the fingers of a user; determining whether a sensing signal received from a wearable device matches a tapping gesture of the first finger in response to having the first finger among the fingers corresponding to the tapping pattern; and generating a tapping input signal corresponding to the first finger in response to the sensing signal matching the tapping gesture of the first finger.

According to the above descriptions, the tapping input signal generating technology (at least including the head-mounted display, the method, and the non-transitory computer readable storage medium) provided by the present disclosure determines whether a first finger among the fingers corresponds to a tapping pattern based on the real-time images. Next, in response to the first finger among the fingers corresponding to the tapping pattern, the tapping input signal generating technology provided by the present disclosure determines whether a sensing signal received from a wearable device matches a tapping gesture of the first finger. Finally, in response to the sensing signal matching the tapping gesture of the first finger, the tapping input signal generating technology provided by the present disclosure generates a tapping input signal corresponding to the first finger. Since the present disclosure only requires the cooperation of the wearable device and the head-mounted display, the user does not need to hold the device or operate physical buttons on the controller. In addition, the tapping input signal generating technology provided by the present disclosure can improve the accuracy of the tapping input data of the user through the determination of the real-time images and the sensing signal.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a head-mounted display, tapping input signal generating method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
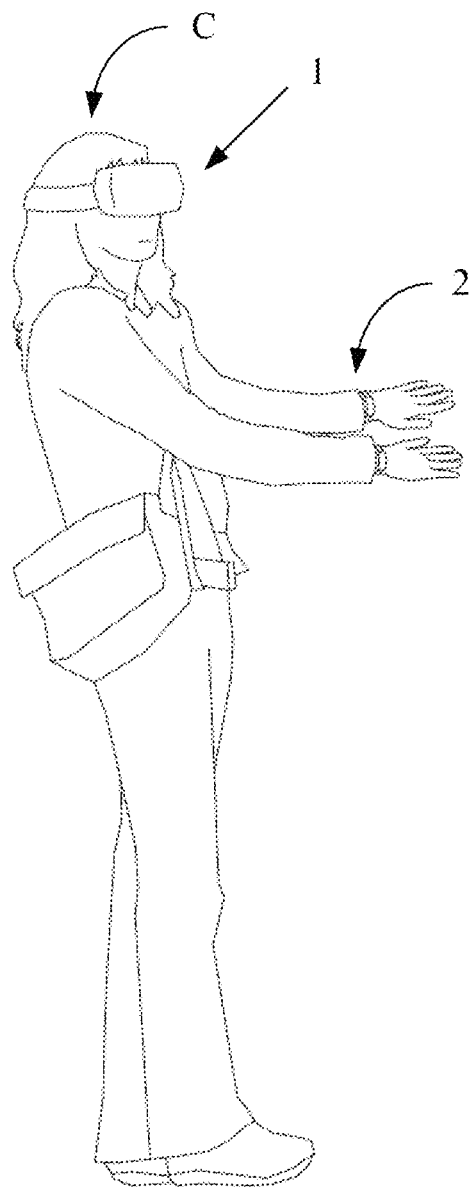
FIG. 1 is a schematic diagram depicting the applicable scene of the head-mounted display of the first embodiment.

First, the applicable scene of the present embodiment will be described, and a schematic diagram of which is depicted in FIG. 1. As shown in FIG. 1, in the application environment of the present disclosure, a user C may use a head-mounted display 1, and the user C may wear one or more wearable device 2 on the wrist (e.g., a smart bracelet) to perform an input operation corresponding to the head-mounted display 1 (for example: a virtual keyboard input operation). In the first embodiment of the present disclosure, the head-mounted display 1 is communicatively connected to the wearable device 2.

It shall be appreciated that FIG. 1 is merely an example for illustration, and the present disclosure does not limit the number of wearable devices 2 connected to the head-mounted display 1. The head-mounted display 1 can be connected to one or more wearable devices at the same time, depending on the scale of the device and the actual needs of the user C.

Figure 2:
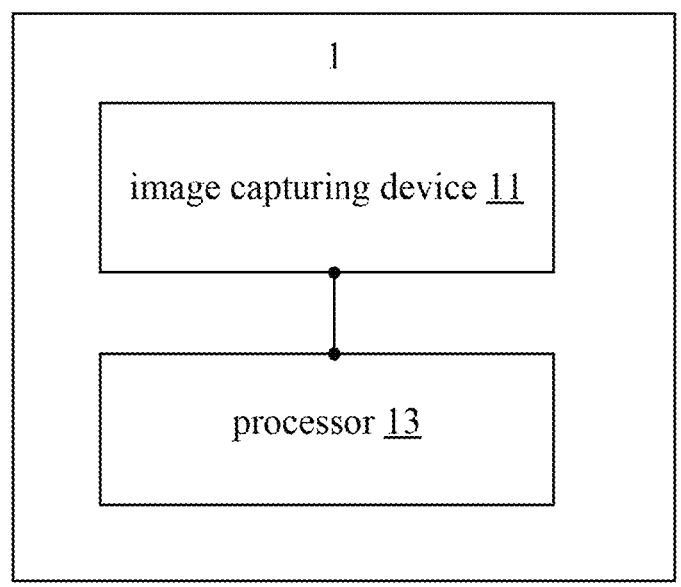
FIG. 2 is a schematic diagram depicting the head-mounted display of some embodiments.

In the present embodiment, a schematic diagram of the structure of the head-mounted display 1 is depicted in FIG. 2. As shown in FIG. 2, the head-mounted display 1 comprises an image capturing device 11 and a processor 13. The processor 13 is coupled to the image capturing device 11.

It shall be appreciated that the image capturing device 11 may comprise a plurality of image capturing units (e.g., a plurality of depth camera lenses) for capturing a plurality of real-time images corresponding to a field of view (FOV). The processor 13 may be any of various processors, Central Processing Units (CPUs), microprocessors, digital signal processors or other computing apparatuses known to those of ordinary skill in the art.

In the present embodiment, the image capturing device 11 in the head-mounted display 1 is configured to capture a plurality of real-time images including a plurality of fingers of the user C.

In the present embodiment, the head-mounted display 1 determines whether there is a first finger among the fingers of the user C corresponds to a tapping pattern based on the real-time images. For example, the head-mounted display 1 may analyze the real-time images through hand tracking technology to determine whether the user C has at least one finger corresponding to a tapping action, and the tapping pattern is configured to indicate that the user C has performed a valid tapping action.

In some embodiments, the processor 13 may determine whether the finger corresponds to a tapping pattern by calculating the displacement distance of the finger. Specifically, the processor 13 calculates a displacement distance corresponding to each of the fingers based on the real-time images. Next, the processor 13 determines whether the first finger among the fingers corresponds to the tapping pattern based on the displacement distances.

In some embodiments, the processor 13 determines whether the displacement distance corresponding to a time interval (e.g., 0.3 seconds) of the first finger among the fingers is greater than a displacement threshold. Next, the processor 13 determines the first finger corresponds to the tapping pattern in response to the displacement distance of the time interval corresponding to the first finger being greater than the displacement threshold.

Next, in the present embodiment, in order to more accurately determine that the hand movement of the user C is a tapping gesture rather than other gestures, the processor 13 may perform gesture analysis based on the sensing signal received by the wearable device 2. Specifically, the processor 13 determines whether a sensing signal received from a wearable device (e.g., the wearable device 2) matches a tapping gesture of the first finger in response to having the first finger among the fingers corresponding to the tapping pattern, and the tapping gesture is configured to indicate that the user C has performed a gesture related to the tapping operation.

In the present embodiment, the head-mounted display 1 may receive a sensing signal from the wearable device 2. It shall be appreciated that the head-mounted display 1 may periodically receive sensing signals from the wearable device 2 based on a predetermined period (e.g., at a fixed frequency of 30 times per second).

In the present embodiment, the sensing signal generated by the wearable device 2 corresponds to the fingers of the user C. For example, the user C may wear the wearable device 2 (e.g., a smart bracelet, a smart watch, etc.) on the wrist to collect sensing data of the finger parts of the user C.

It shall be appreciated that the wearable device 2 may generate corresponding sensing signals when the user C taps with different fingers, (i.e., when the user C taps with different fingers, sensing signals with different values will be generated), the processor 13 can identify which finger the user C uses to tap by comparing the sensing signal received from the wearable device 2, and identify whether the sensing signal corresponds to a tapping gesture or other gestures (e.g., finger flick).

For example, when the user C taps correctly, the sensing signal generated usually includes a coherent action of pressing the finger and then lifting the finger. Therefore, if the sensing signal sensed by the wearable device 2 is only a single action of pressing, the processor 13 determines that the user C only performs a simple placing action.

Figure 3A:
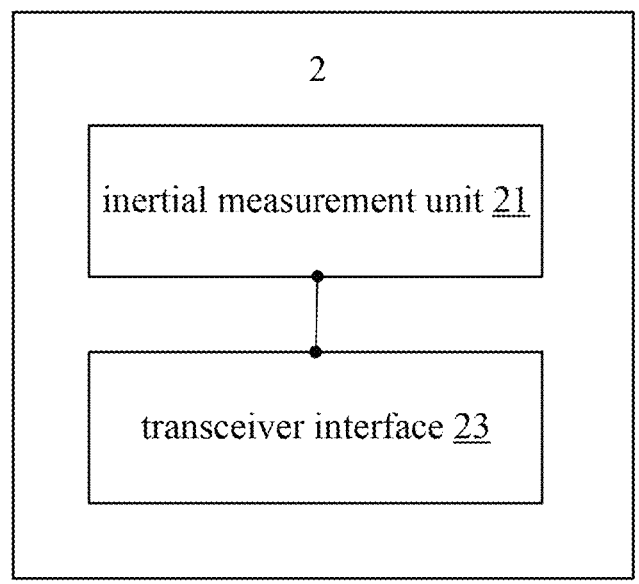
FIG. 3A is a schematic diagram depicting the wearable device of some embodiments.

In some embodiments, the sensing signal may comprise an inertial signal. For example, as shown in FIG. 3A, the wearable device 2 comprises an inertial measurement unit 21 and a transceiver interface 23, and the transceiver interface 23 is electrically connected to the inertial measurement unit 21. The inertial measurement unit 21 is configured to detect an inertial signal corresponding to the hand of the user C wearing the wearable device 2. The transceiver interface 23 is an interface capable of receiving and transmitting data or other interfaces capable of receiving and transmitting data and known to those of ordinary skill in the art.

In some embodiments, when the wearable device 2 comprises an inertial measurement unit 21 (e.g., FIG. 3A), the processor 13 compares the inertial signal with a plurality of gesture inertial signals (e.g., the recorded gesture inertial signals of each finger) to identify whether the inertial signal matches the tapping gesture of the first finger.

Specifically, the inertial measurement unit (IMU) may continuously generate a sequence of multiple inertial signals (e.g., an inertial measurement parameter stream generated at a frequency of 10 times per second), and each of the inertial signals may comprise an acceleration, a rotation amount and an angular acceleration. During operation, the head-mounted display 1 may periodically receive the inertial signals from the wearable device 2.

Figure 3B:
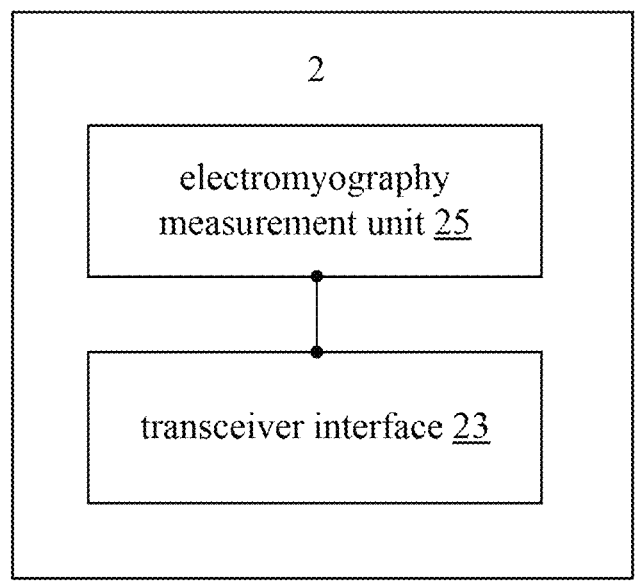
FIG. 3B is a schematic diagram depicting the wearable device of some embodiments.

In some embodiments, the sensing signal may comprise an electromyography (EMG) signal. For example, as shown in FIG. 3B, the wearable device 2 comprises the electromyography measurement unit 25 and the transceiver interface 23, and the transceiver interface 23 is electrically connected to the electromyography measurement unit 25. The electromyography measurement unit 25 is configured to detect an electromyography signal corresponding to the hand of the user C wearing the wearable device 2.

In some embodiments, when the wearable device 2 comprises the electromyography measurement unit 25 (e.g., FIG. 3B), the processor 13 compares the electromyography signal with a plurality of gesture electromyography signals (e.g., the recorded gesture inertial signals of each finger) to identify whether the electromyography signal matches the tapping gesture of the first finger.

Figure 3C:
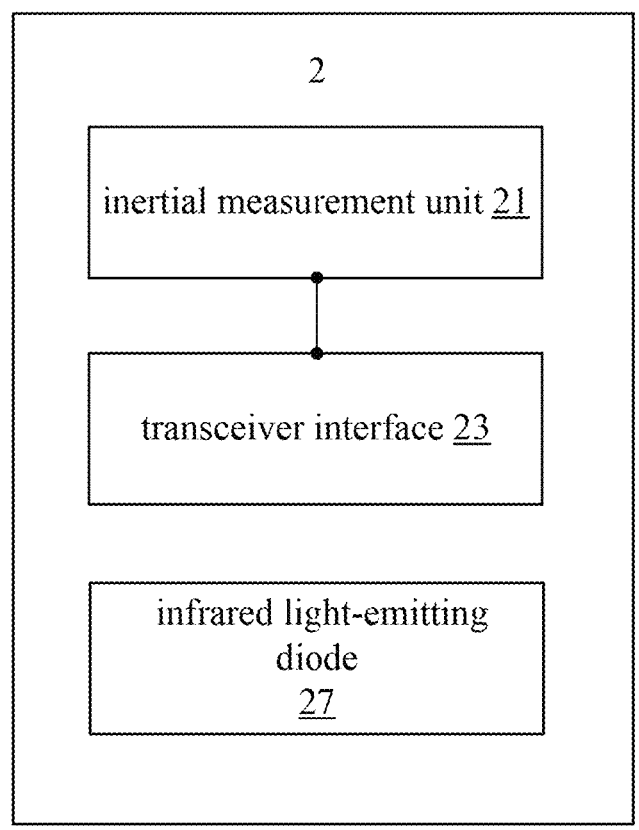
FIG. 3C is a schematic diagram depicting the wearable device of some embodiments.
Figure 3D:
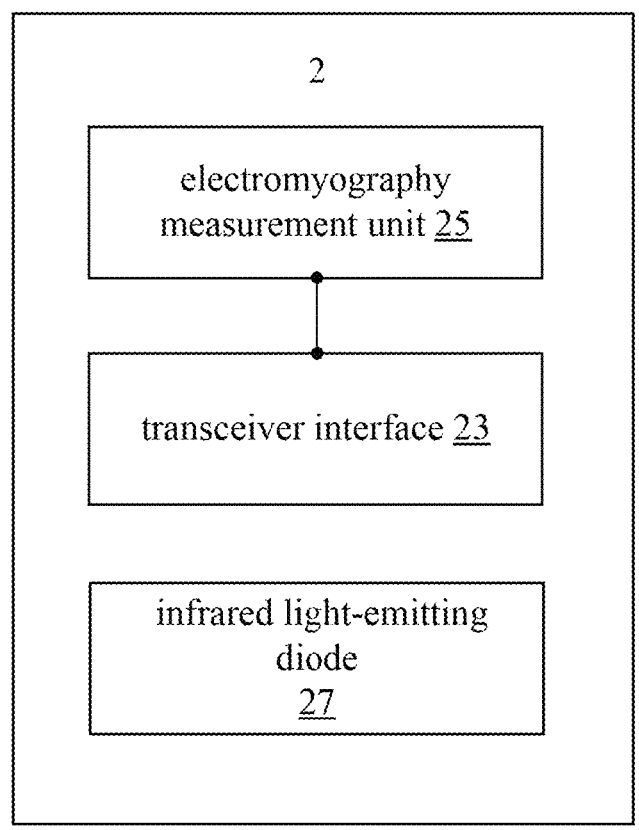
FIG. 3D is a schematic diagram depicting the wearable device of some embodiments.

In some embodiments, in order to determine the position and movement distance of the fingers more accurately, the head-mounted display 1 may locate the positions of the joints of the user C's hand through the infrared rays on the wearable device 2, and calculate a finger position and a displacement distance corresponding to each of the fingers. For example, as shown in FIG. 3C and FIG. 3D, the wearable device 2 may further comprise an infrared light-emitting diode 27, and the infrared light-emitting diode 27 is configured to generate an infrared ray.

Finally, in the present embodiment, the processor 13 generates a tapping input signal corresponding to the first finger in response to the sensing signal matching the tapping gesture of the first finger.

In some embodiments, the tapping input signal corresponds to the finger position of the first finger. Specifically, the processor 13 further calculates a finger position corresponding to each of the fingers based on the real-time images (e.g., an absolute coordinate position or a relative coordinate position in space). Next, the processor 13 generates the tapping input signal corresponding to the finger position of the first finger in response to the sensing signal matching the tapping gesture of the first finger.

In some embodiments, in order to save computing resources and avoid misjudgments, the head-mounted display 1 may only execute the corresponding determination when it is determined that the hand of the user C is located on a virtual plane. Specifically, the processor 13 determines a virtual plane position based on the real-time images. Next, the processor 13 determines whether the first finger among the fingers corresponds to the tapping pattern in response to the finger positions being located on the virtual plane position.

It shall be appreciated that the processor 13 may determine the virtual plane position by identifying a plane block in the real-time images. In some embodiments, the virtual plane position corresponds to a physical plane position in a physical space (e.g., a flat desktop). In some embodiments, the user C needs to place both hands on the physical plane to perform the corresponding input operation (i.e., the virtual plane position needs to correspond to the physical plane position).

Figure 4:
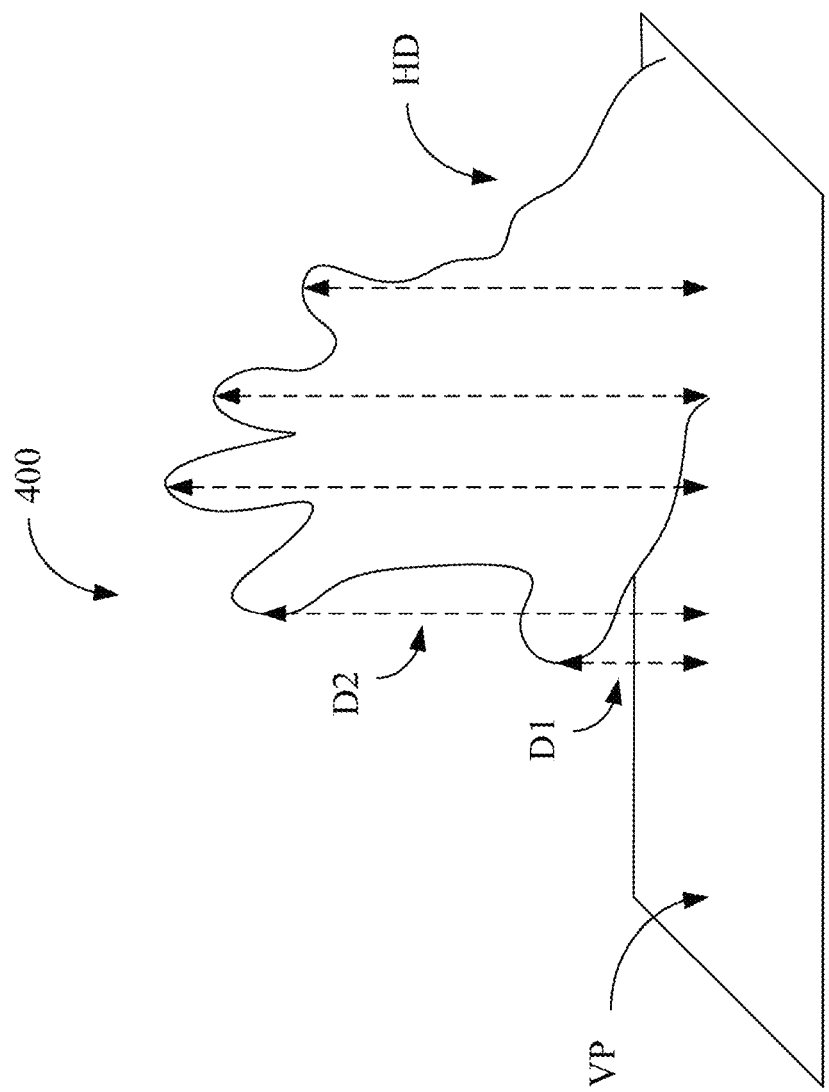
FIG. 4 is a schematic diagram depicting the operation of some embodiments.

For ease of understanding, please refer to the operation schematic diagram 400 in FIG. 4, which illustrates a schematic diagram of the operation performed by the user C with the right hand. In the present example, the right finger of the user C is located on the virtual plane VP.

As shown in FIG. 4, the processor 13 may calculate the distance between each finger of the user C's hand HD and the virtual plane VP, and set the corresponding displacement threshold of each of the fingers according to the distance. For example, the distance between the thumb and the virtual plane VP is D1, and the processor 13 may set the displacement threshold of the thumb to D1 (i.e., when the processor 13 determines that the displacement distance of the thumb of the user C exceeds D1, the processor 13 determines the thumb corresponds to the tapping pattern).

For another example, the distance between the index finger and the virtual plane VP is D2, and the processor 13 may set the displacement threshold of the index finger to D2 (i.e., when the processor 13 determines that the displacement distance of the index finger of the user C exceeds D2, the processor 13 determines the index finger corresponds to the tapping pattern).

In some embodiments, the virtual plane position corresponds to a virtual keyboard, and the tapping input signal comprises an input operation of the virtual keyboard corresponding to the finger position of the first finger. For example, when the processor 13 determines that the user C taps with the thumb, and the position of the thumb is located on the key "S" of the virtual keyboard, the tapping input signal generated by the processor 13 may include the input operate of the key "S".

Figure 5:
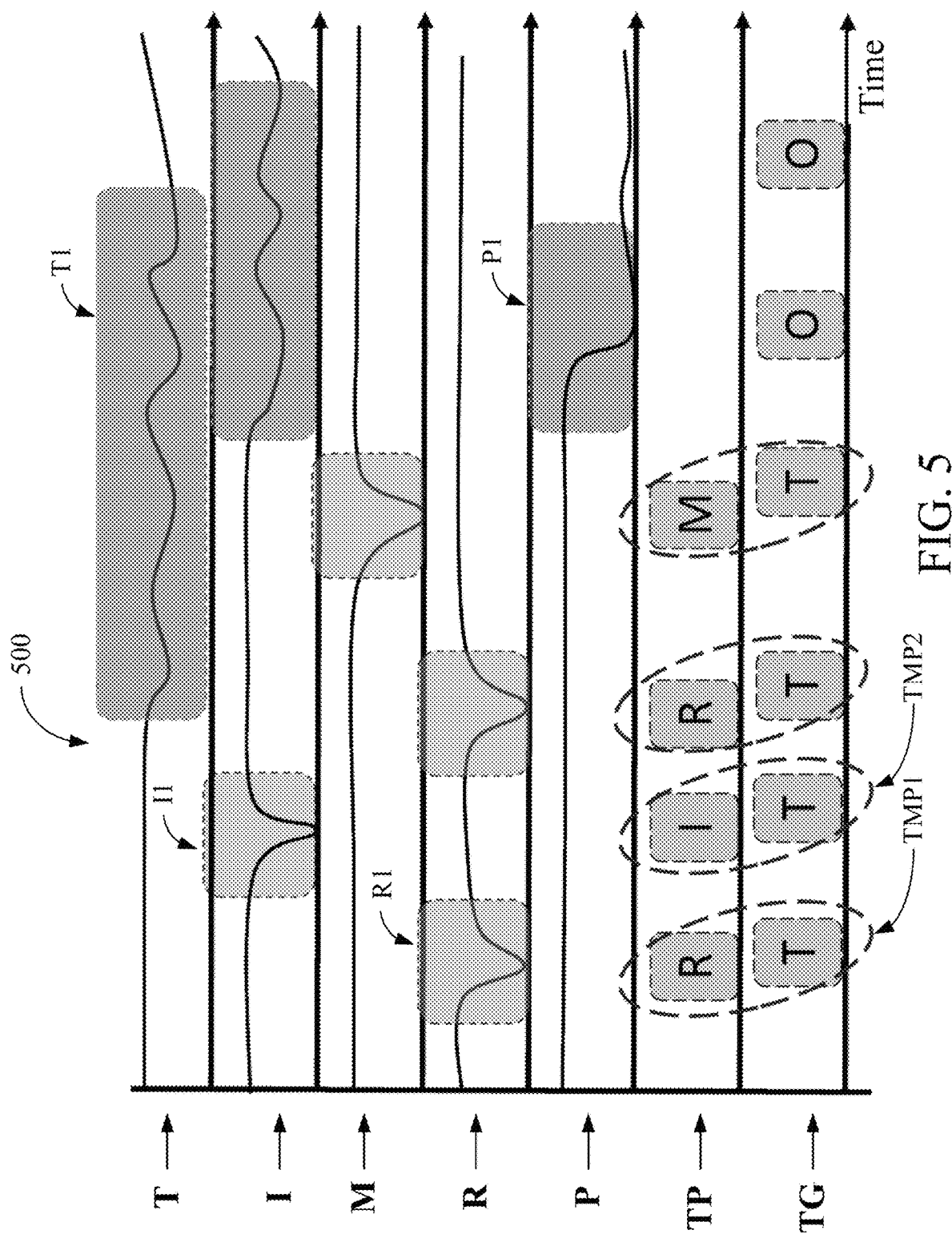
FIG. 5 is a schematic diagram depicting the operation timing of some embodiments.

For ease of understanding, please refer to the operation timing diagram 500 in FIG. 5. As shown in FIG. 5, the X-axis of the operation timing diagram 500 corresponds to the determination operation timing of the thumb T, index finger I, middle finger M, ring finger R, and pinky finger P, and the determination results of the tapping pattern TP and tapping gesture TG.

As shown in FIG. 5, the processor 13 determines that the ring finger R performs a corresponding tapping pattern in the time interval R1 (e.g., 0.3 seconds), and the processor 13 determines that the tapping gesture TG corresponds to the tapping gesture T rather than other gestures O. Therefore, the determination result of the tapping pattern TP corresponding to the time point TMP1 is the ring finger R, the determination result of the tapping gesture TG is the tapping gesture T, and the processor 13 generates a tapping input signal corresponding to the ring finger R and its finger position.

In addition, the processor 13 determines that the index finger I performs the corresponding tapping pattern in the time interval I1, and the processor 13 determines that the tapping gesture TG corresponds to the tapping gesture T rather than other gestures O. Therefore, the determination result of the tapping pattern TP corresponding to the time point TMP2 is the index finger I, the determination result of the tapping gesture TG is the tapping gesture T, and the processor 13 generates a tapping input signal corresponding to the index finger I and its finger position.

In addition, since the range of movement performed by the thumb T in the time interval T1 does not exceed the displacement threshold, the processor 13 determines that the displacement of the thumb T does not belong to the tapping pattern, and thus the processor 13 does not need to make further determinations.

In addition, although the range of movement performed by the pinky finger P in the time interval P1 exceeds the displacement threshold; however, the processor 13 determines that the action of the pinky finger P does not belong to a tapping gesture (i.e., belongs to other gestures O), and thus the processor 13 does not need to make further determinations.

According to the above descriptions, the head-mounted display 1 provided by the present disclosure determines whether a first finger among the fingers corresponds to a tapping pattern based on the real-time images. Next, in response to the first finger among the fingers corresponding to the tapping pattern, the head-mounted display 1 provided by the present disclosure determines whether a sensing signal received from a wearable device matches a tapping gesture of the first finger. Finally, in response to the sensing signal matching the tapping gesture of the first finger, the head-mounted display 1 provided by the present disclosure generates a tapping input signal corresponding to the first finger. Since the present disclosure only requires the cooperation of the wearable device and the head-mounted display, the user does not need to hold the device or operate physical buttons on the controller. In addition, the head-mounted display 1 provided by the present disclosure can improve the accuracy of the tapping input data of the user through the determination of the real-time images and the sensing signal.

Figure 6:
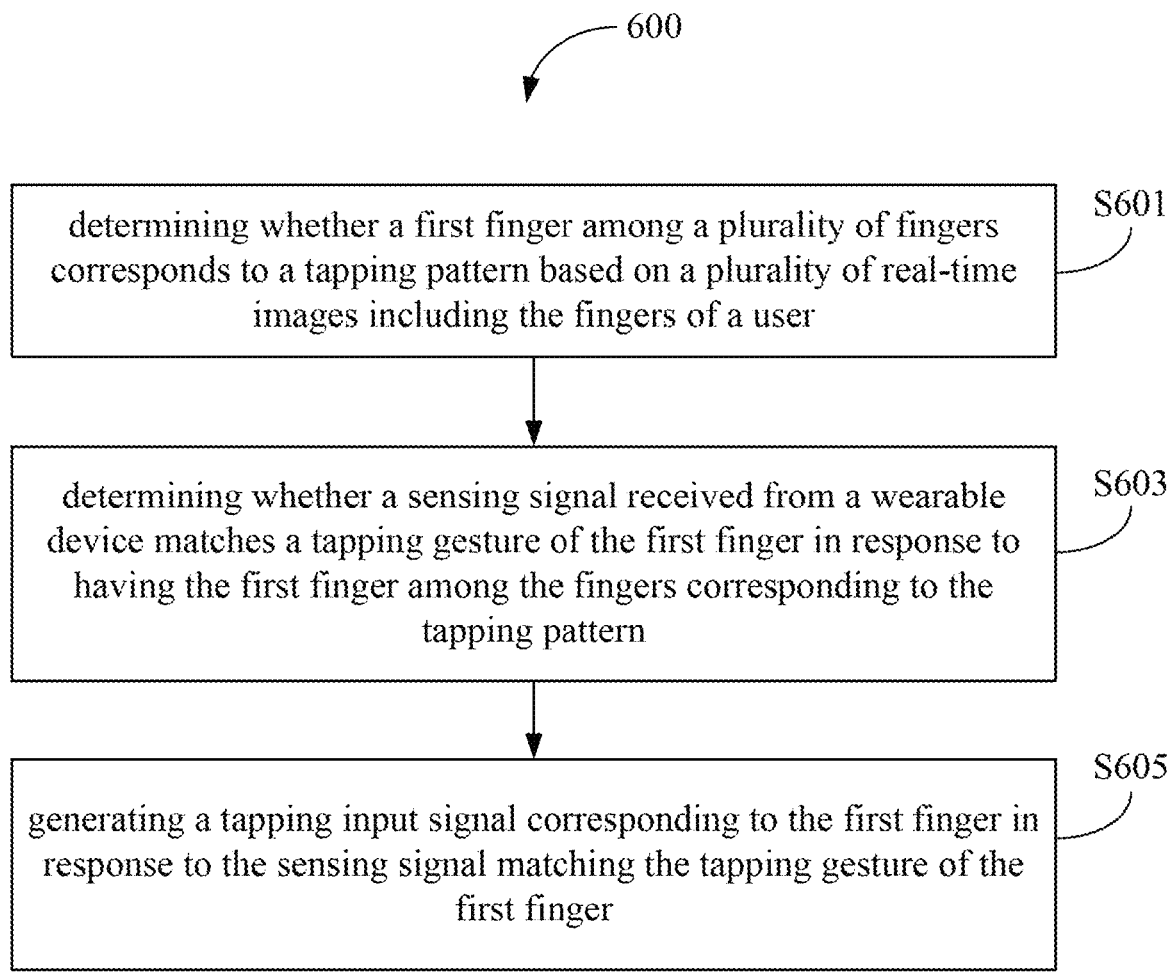
FIG. 6 is a partial flowchart depicting the tapping input signal generating method of the second embodiment.

A second embodiment of the present disclosure is a tapping input signal generating method and a flowchart thereof is depicted in FIG. 6. The tapping input signal generating method 600 is adapted for an electronic apparatus (e.g., the head-mounted display 1 described in the first embodiment). The tapping input signal generating method 600 generates a tapping input signal through the steps S601 to S605.

In the step S601, the electronic apparatus determines whether a first finger among a plurality of fingers corresponds to a tapping pattern based on a plurality of real-time images including the fingers of a user. Next, in the step S603, the electronic apparatus determines whether a sensing signal received from a wearable device matches a tapping gesture of the first finger in response to having the first finger among the fingers corresponding to the tapping pattern.

Finally, in the step S605, the electronic apparatus generates a tapping input signal corresponding to the first finger in response to the sensing signal matching the tapping gesture of the first finger.

In some embodiments, the tapping input signal generating method 600 further comprises the following steps: calculating a displacement distance corresponding to each of the fingers based on the real-time images; and determining whether the first finger among the fingers corresponds to the tapping pattern based on the displacement distances.

In some embodiments, the step of determining whether the first finger among the fingers corresponds to the tapping pattern further comprises the following steps: determining whether the displacement distance corresponding to a time interval of the first finger among the fingers is greater than a displacement threshold; and determining the first finger corresponds to the tapping pattern in response to the displacement distance of the time interval corresponding to the first finger being greater than the displacement threshold.

In some embodiments, the tapping input signal generating method 600 further comprises the following steps: calculating a finger position corresponding to each of the fingers based on the real-time images; and generating the tapping input signal corresponding to the finger position of the first finger in response to the sensing signal matching the tapping gesture of the first finger.

In some embodiments, the tapping input signal generating method 600 further comprises the following steps: determining a virtual plane position based on the real-time images; and determining whether the first finger among the fingers corresponds to the tapping pattern in response to the finger positions being located on the virtual plane position.

In some embodiments, the virtual plane position corresponds to a physical plane position in a physical space.

In some embodiments, the virtual plane position corresponds to a virtual keyboard, and the tapping input signal comprises an input operation of the virtual keyboard corresponding to the finger position of the first finger.

In some embodiments, the wearable device further comprises an inertial measurement unit, the sensing signal comprises an inertial signal, and the tapping input signal generating method 600 further comprises following steps: comparing the inertial signal with a plurality of gesture inertial signals to identify whether the inertial signal matches the tapping gesture of the first finger.

In some embodiments, the wearable device further comprises an electromyography measurement unit, the sensing signal comprises an electromyography signal, and the tapping input signal generating method 600 further comprises following steps: comparing the electromyography signal with a plurality of gesture electromyography signals to identify whether the electromyography signal matches the tapping gesture of the first finger.

In addition to the aforesaid steps, the second embodiment can also execute all the operations and steps of the head-mounted display 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The tapping input signal generating method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the head-mounted display 1), the computer program executes the tapping input signal generating method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the finger) are preceded by terms such as "first", and the term of "first" is only used to distinguish these different words. For example, the "first" finger is only used to indicate one of the fingers.

According to the above descriptions, the tapping input signal generating technology (at least including the head-mounted display, the method, and the non-transitory computer readable storage medium) provided by the present disclosure determines whether a first finger among the fingers corresponds to a tapping pattern based on the real-time images. Next, in response to the first finger among the fingers corresponding to the tapping pattern, the tapping input signal generating technology provided by the present disclosure determines whether a sensing signal received from a wearable device matches a tapping gesture of the first finger. Finally, in response to the sensing signal matching the tapping gesture of the first finger, the tapping input signal generating technology provided by the present disclosure generates a tapping input signal corresponding to the first finger. Since the present disclosure only requires the cooperation of the wearable device and the head-mounted display, the user does not need to hold the device or operate physical buttons on the controller. In addition, the tapping input signal generating technology provided by the present disclosure can improve the accuracy of the tapping input data of the user through the determination of the real-time images and the sensing signal.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A head-mounted display, comprising:
    an image capturing device, configured to capture a plurality of real-time images including a plurality of fingers of a user; and
    a processor, coupled to the image capturing device, and configured to perform the following operations:
        determining a virtual plane position based on the real-time images;
        calculating a distance between each of the fingers and the virtual plane position to set a displacement threshold of each of the fingers based on the real-time images;
        calculating a displacement distance corresponding to each of the fingers based on the real-time images;
        determining whether there is a first finger among the fingers corresponds to a tapping pattern based on the displacement distance and the displacement threshold of each of the fingers;
        determining whether a sensing signal received from a wearable device matches a tapping gesture of the first finger in response to having the first finger among the fingers corresponding to the tapping pattern; and
        generating a tapping input signal corresponding to the first finger in response to the sensing signal matching the tapping gesture of the first finger.

2. The head-mounted display of claim 1, wherein the operation of determining whether the first finger among the fingers corresponds to the tapping pattern further comprises the following operations:
    determining whether the displacement distance corresponding to a time interval of the first finger among the fingers is greater than a displacement threshold; and
    determining the first finger corresponds to the tapping pattern in response to the displacement distance of the time interval corresponding to the first finger being greater than the displacement threshold.

3. The head-mounted display of claim 1, wherein the processor is further configured to perform the following operations:
    calculating a finger position corresponding to each of the fingers based on the real-time images; and
    generating the tapping input signal corresponding to the finger position of the first finger in response to the sensing signal matching the tapping gesture of the first finger.

4. The head-mounted display of claim 3, wherein the processor is further configured to perform the following operations:
    determining whether the first finger among the fingers corresponds to the tapping pattern in response to the finger positions being located on the virtual plane position.

5. The head-mounted display of claim 4, wherein the virtual plane position corresponds to a physical plane position in a physical space.

6. The head-mounted display of claim 4, wherein the virtual plane position corresponds to a virtual keyboard, and the tapping input signal comprises an input operation of the virtual keyboard corresponding to the finger position of the first finger.

7. The head-mounted display of claim 1, wherein the wearable device further comprises an inertial measurement unit, the sensing signal comprises an inertial signal, and the processor is further configured to perform the following operations:
    comparing the inertial signal with a plurality of gesture inertial signals to identify whether the inertial signal matches the tapping gesture of the first finger.

8. The head-mounted display of claim 1, wherein the wearable device further comprises an electromyography measurement unit, the sensing signal comprises an electromyography signal, and the processor is further configured to perform the following operations:
    comparing the electromyography signal with a plurality of gesture electromyography signals to identify whether the electromyography signal matches the tapping gesture of the first finger.

9. The head-mounted display of claim 1, wherein the wearable device further comprises an infrared light-emitting diode, the infrared light-emitting diode is configured to generate an infrared ray, and the processor is further configured to perform the following operations:

calculating a finger position and a displacement distance corresponding to each of the fingers based on the real-time images and the infrared ray.

10. A tapping input signal generating method, being adapted for use in an electronic apparatus, wherein the tapping input signal generating method comprises the following steps:
- determining a virtual plane position based on a plurality of real-time images including a plurality of fingers of a user;
- calculating a distance between each of the fingers and the virtual plane position to set a displacement threshold of each of the fingers based on the real-time images;
- calculating a displacement distance corresponding to each of the fingers based on the real-time images;
- determining whether there is a first finger among the fingers corresponds to a tapping pattern based on the displacement distance and the displacement threshold of each of the fingers;
- determining whether a sensing signal received from a wearable device matches a tapping gesture of the first finger in response to having the first finger among the fingers corresponding to the tapping pattern; and
- generating a tapping input signal corresponding to the first finger in response to the sensing signal matching the tapping gesture of the first finger.

11. The tapping input signal generating method of claim 10, wherein the step of determining whether the first finger among the fingers corresponds to the tapping pattern further comprises the following steps:
- determining whether the displacement distance corresponding to a time interval of the first finger among the fingers is greater than a displacement threshold; and
- determining the first finger corresponds to the tapping pattern in response to the displacement distance of the time interval corresponding to the first finger being greater than the displacement threshold.

12. The tapping input signal generating method of claim 10, wherein the tapping input signal generating method further comprises the following steps:
- calculating a finger position corresponding to each of the fingers based on the real-time images; and
- generating the tapping input signal corresponding to the finger position of the first finger in response to the sensing signal matching the tapping gesture of the first finger.

13. The tapping input signal generating method of claim 12, wherein the tapping input signal generating method further comprises following steps:
- determining whether the first finger among the fingers corresponds to the tapping pattern in response to the finger positions being located on the virtual plane position.

14. The tapping input signal generating method of claim 13, wherein the virtual plane position corresponds to a physical plane position in a physical space.

15. The tapping input signal generating method of claim 13, wherein the virtual plane position corresponds to a virtual keyboard, and the tapping input signal comprises an input operation of the virtual keyboard corresponding to the finger position of the first finger.

16. The tapping input signal generating method of claim 10, wherein the wearable device further comprises an inertial measurement unit, the sensing signal comprises an inertial signal, and the tapping input signal generating method further comprises following steps:
- comparing the inertial signal with a plurality of gesture inertial signals to identify whether the inertial signal matches the tapping gesture of the first finger.

17. The tapping input signal generating method of claim 10, wherein the wearable device further comprises an electromyography measurement unit, the sensing signal comprises an electromyography signal, and the tapping input signal generating method further comprises following steps:
- comparing the electromyography signal with a plurality of gesture electromyography signals to identify whether the electromyography signal matches the tapping gesture of the first finger.

18. A non-transitory computer readable storage medium, having a computer program stored therein, wherein the computer program comprises a plurality of codes, the computer program executes a tapping input signal generating method after being loaded into an electronic apparatus, the tapping input signal generating method comprises:
- determining a virtual plane position based on a plurality of real-time images including a plurality of fingers of a user;
- calculating a distance between each of the fingers and the virtual plane position to set a displacement threshold of each of the fingers based on the real-time images;
- calculating a displacement distance corresponding to each of the fingers based on the real-time images;
- determining whether there is a first finger among the fingers corresponds to a tapping pattern based on the displacement distance and the displacement threshold of each of the fingers;
- determining whether a sensing signal received from a wearable device matches a tapping gesture of the first finger in response to having the first finger among the fingers corresponding to the tapping pattern; and
- generating a tapping input signal corresponding to the first finger in response to the sensing signal matching the tapping gesture of the first finger.

* * * * *